United States Patent
Lighty et al.

(10) Patent No.: US 11,300,008 B2
(45) Date of Patent: Apr. 12, 2022

(54) LUBRICATION SCAVENGE SYSTEM FOR A TURBINE ENGINE WITH COUNTER-ROTATING SHAFTS

(71) Applicants: Rolls-Royce Corporation, Indianapolis, IN (US); Rolls-Royce North American Technologies, Inc., Indianapolis, IN (US)

(72) Inventors: Kerry J. Lighty, Plainfield, IN (US); Phillip Burnside, Avon, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 205 days.

(21) Appl. No.: 16/591,388

(22) Filed: Oct. 2, 2019

(65) Prior Publication Data
US 2020/0032671 A1 Jan. 30, 2020

Related U.S. Application Data

(62) Division of application No. 15/493,219, filed on Apr. 21, 2017, now Pat. No. 10,480,348.
(Continued)

(51) Int. Cl.
*F01D 25/18* (2006.01)
*F16H 57/04* (2010.01)
(Continued)

(52) U.S. Cl.
CPC ............ *F01D 25/18* (2013.01); *F01D 25/16* (2013.01); *F16C 17/02* (2013.01); *F16C 33/10* (2013.01);
(Continued)

(58) Field of Classification Search
CPC .. F01D 25/18; F16H 57/0423; F16H 57/0424; F16C 33/10
See application file for complete search history.

(56) References Cited

U.S. PATENT DOCUMENTS

| | | | | |
|---|---|---|---|---|
| 1,402,055 A | * | 1/1922 | Dake | ............ F01D 25/18 |
| | | | | 384/404 |
| 6,893,208 B2 | | 5/2005 | Frosini et al. | |

(Continued)

FOREIGN PATENT DOCUMENTS

| | | |
|---|---|---|
| EP | 1103706 A2 | 5/2001 |
| EP | 1544417 A2 | 6/2005 |

(Continued)

OTHER PUBLICATIONS

European Patent Office, Extended European Search Report for corresponding EP Application No. 17167982.2 dated Sep. 28, 2017, 10pgs.
(Continued)

*Primary Examiner* — Minh Truong
(74) *Attorney, Agent, or Firm* — Shumaker & Sieffert, P.A.

(57) ABSTRACT

A lubricant scavenging system for a turbine engine having a pair of concentric, counter-rotating shafts. The system comprises a lubricant sump housing having a radially inner surface, a pair of pedestal mounts each adapted to receive a bearing assembly from a respective shaft, a lubricant collection point axially disposed between the pedestal mounts, and a pair of axial channels adapted to guide lubricant toward the lubricant collection point.

8 Claims, 7 Drawing Sheets

Related U.S. Application Data

(60) Provisional application No. 62/329,797, filed on Apr. 29, 2016.

(51) Int. Cl.
*F01D 25/16* (2006.01)
*F16C 17/02* (2006.01)
*F16C 33/10* (2006.01)

(52) U.S. Cl.
CPC ........ *F16C 33/106* (2013.01); *F16C 33/1045* (2013.01); *F16H 57/0424* (2013.01); *F05D 2260/602* (2013.01); *F05D 2260/609* (2013.01); *F05D 2260/98* (2013.01); *F16C 2360/23* (2013.01)

(56) References Cited

U.S. PATENT DOCUMENTS

| | | | |
|---|---|---|---|
| 6,996,968 | B2 | 2/2006 | Peters et al. |
| 8,201,663 | B2 | 6/2012 | Munson |
| 8,905,885 | B2 | 12/2014 | Yamamoto et al. |
| 9,217,336 | B2 | 12/2015 | Nielson et al. |
| 9,341,117 | B2 | 5/2016 | Remer et al. |
| 10,138,813 | B2 | 11/2018 | Andersson et al. |
| 10,208,850 | B1 | 2/2019 | Patel |
| 10,480,348 | B2 | 11/2019 | Lighty et al. |
| 2005/0132710 | A1 | 6/2005 | Peters et al. |
| 2006/0054408 | A1 | 3/2006 | Swainson |
| 2006/0251512 | A1 | 11/2006 | Singh et al. |
| 2008/0134657 | A1 | 6/2008 | DiBenedetto et al. |
| 2010/0058729 | A1 | 3/2010 | Fomison et al. |
| 2013/0283758 | A1 | 10/2013 | Wotzak |
| 2014/0064930 | A1 | 3/2014 | Nguyenloc et al. |
| 2015/0315933 | A1 | 11/2015 | Do et al. |
| 2016/0195016 | A1* | 7/2016 | Andersson .......... F16C 33/1045 415/213.1 |
| 2016/0201848 | A1 | 7/2016 | Bordne et al. |
| 2017/0051822 | A1 | 2/2017 | Toaso, Jr. et al. |
| 2018/0003081 | A1* | 1/2018 | Isayama ................ F04D 29/063 |

FOREIGN PATENT DOCUMENTS

| | | |
|---|---|---|
| EP | 2071131 A2 | 6/2009 |
| FR | 2955152 A1 | 7/2011 |
| WO | 2015043788 A1 | 4/2015 |

OTHER PUBLICATIONS

Response to Extended European Search Report for corresponding EP Application No. 17167982.2 dated Sep. 28, 2017, filed Apr. 11, 2018, 50 pgs.
Response to Communication pursuant to Article 94(3) EPC for corresponding EP Application No. 17167982.2 dated Feb. 8, 2019, filed Jun. 10, 2019, 51 pgs.
Communication pursuant to Article 94(3) EPC for corresponding EP Application No. 17167982.2 dated Feb. 8, 2019, 6 pgs.
Communication under Rule 71(3) EPC for corresponding EP Application No. 17167982.2 dated Mar. 31, 2020, 67 pgs.
Prosecution history from U.S. Appl. No. 15/493,219 dated Apr. 9, 2019 to Oct. 2, 2019, 33 pgs.

* cited by examiner

LUBRICATION SCAVENGE SYSTEM FOR A TURBINE ENGINE WITH COUNTER-ROTATING SHAFTS

CROSS REFERENCE TO RELATED APPLICATIONS

This application is a divisional of and claims the benefit of U.S. patent application Ser. No. 15/493,219, filed Apr. 21, 2017, which claims priority to U.S. Provisional Patent Application No. 62/329,797, filed Apr. 29, 2016, the entirety of which is hereby incorporated by reference.

FIELD OF THE DISCLOSURE

The present disclosure relates generally to lubrication scavenging, and more specifically to scavenging lubricant from a lubricated component that supports a structure rotating at a relatively high speed such as, for example, a shaft or bearing of a turbine engine.

BACKGROUND

Turbine and turbofan engines provide energy for a wide range of applications. FIG. 1 is a block schematic diagram of a typical turbofan engine 100. The turbofan engine 100 comprises an inlet fan 101, a compressor 103, a combustor 105, a high-pressure turbine 107, a low-pressure turbine 109, a bypass region 111, and an exhaust mixing region 113. The inlet fan 101 is mounted to the front of the compressor 103. The engine core 115 is defined as the compressor 103, combustor 105, high-pressure turbine 107, and low-pressure turbine 109. Turboshaft engines have a similar arrangement to the turbofan engine 100 illustrated in FIG. 1, but typically do not include an inlet fan 101.

Air enters the turbofan engine 100 via inlet fan 101. A first portion of the air flows through the bypass region 111 and into the exhaust mixing region 113. A second portion of the air flows into the compressor 103 where it is pressurized, then into the combustor where it is mixed with fuel and ignited. The ratio of the first portion of air flowing through the bypass region 111 to the second portion of air flowing through the engine core 115 is referred to as the bypass ratio.

The hot, high-pressure combustion gasses are directed sequentially into the high-pressure turbine 107 and low-pressure turbine 109, causing each turbine 107, 109 to rotate about a shaft which is connected to and drives the compressor 103 and the inlet fan 101. In multiple-spool designs, more than one concentric shafts are used to separately rotate various components. For example, in a standard two-spool turbofan engine the high-pressure turbine 107 and at least a portion of compressor 103 are connected using a first common shaft (often referred to as the high pressure shaft) while the low-pressure turbine 109 and inlet fan 101 are connected using a second common shaft (often referred to as the low pressure shaft). A portion of compressor 103 may also be connected to the second common shaft.

Engine components which rotate at relatively high speeds include the inlet fan 101, the high pressure compressor 103, the high-pressure turbine 107, the low-pressure turbine 109, and the one or more shafts. These rotating components are generally supported by lubricated components such as bearings. Lubricant is supplied under pressure to the lubricated components and a sump, either rotating with the rotating components or stationary (non-rotating) is often disposed about the lubricated component to collect (scavenge) the lubricant expelled from the lubricated component.

Lubricant scavenging in the vicinity of a rotating shaft can be problematic. Shaft rotation causes air inside the lubricant sump to rotate in the same direction as the shaft, which tends to force lubricant droplets exiting a lubricated component to form a thin lubricant film on a radially-inner surface of the sump. The momentum of the lubricant droplets and the force of the rotating air (windage) inside the sump will drive the lubricant film around the circumference of the radially-inner surface of the sump, which makes it difficult to direct the lubricant film into a collection point.

This difficulty and complexity of collecting lubricant is exacerbated in an engine having counter-rotating shafts. Two zones of rotating air are formed, one in the vicinity of each shaft. Where these zones come together, vortices and complex air flow patterns are formed.

Previous attempts to collect lubricant in this complex environment have included the use of multiple collection points which leads to a further problem of needing to transfer the lubricant to a single point for pressurization and distribution back to the lubricated component. Other attempts have included the use of multiple collection points leading to multiple reservoirs, which necessitates additional lines and pumps to distribute the lubricant to one or more lubricated components. These extra parts incur a weight penalty that can be significant for some turbine engine applications such as aviation, undesirably add to the complexity of the engine design, and increase the need and cost of system maintenance.

There is thus a need in the art for an improved lubricant scavenge system which overcomes the deficiencies noted above, particularly as they relate to a turbine engine having counter-rotating shafts.

The present application discloses one or more of the features recited in the appended claims and/or the following features which, alone or in any combination, may comprise patentable subject matter.

SUMMARY

According to an aspect of the present disclosure, a gas turbine comprises a high pressure shaft having a terminal portion, a low pressure shaft, having an exposed portion extending axially beyond the terminal portion, the low pressure shaft concentric with the high pressure shaft, an interface region proximate the terminal and exposed portions, a sump housing radially surrounding the high pressure shaft and the low pressure shaft proximate the interface region, the sump housing comprising: a radially inner surface; a first pedestal mount for the terminal portion of the high pressure shaft and a second pedestal mount for the exposed portion of the low pressure shaft, each pedestal mount comprising an annular mount ring and plurality of stand-off pedestals, each pedestal mount extending radially inward from the radially inner surface of the sump housing, an orifice located in the interface region and axially between first pedestal mount and second pedestal mount, and a first axial channel formed through first pedestal mount and a second axial channel formed through the second pedestal mount, wherein both first axial channel and second axial channel lead to the orifice.

In some embodiments the turbine further comprises a recess formed in the radially inner surface of sump housing proximate the orifice. In some embodiments the recess is formed with blunt walls. In some embodiments the turbine further comprises a pair of turning passages formed in the sump housing that extend circumferentially around the sump and turn axially towards the orifice, wherein the turning passages are formed in part by at least a portion of the first axial channel and second axial channel respectively. In some embodiments the turbine further comprises a wall extending radially inward from the sump housing on both sides of the interface and oriented parallel to the axial direction. In some embodiments the turbine further comprises a pair of blunt walls arranged transverse to lubricant flowing in the pair of turning passages. In some embodiments radial distance from the axis increases in each of the pair of turning passages as a function of axial proximity to the orifice. In some embodiments the orifice is located at the bottom of the sump housing such that gravitational forces allow the lubricant to drain through the orifice. In some embodiments the sump housing further comprises a forward portion and aft portion axially disposed about a central portion, and wherein the radially inner surfaces of forward portion and aft portion are axially sloped toward central portion. In some embodiments the recess is rectangular.

According to another aspect of the present disclosure, a method of scavenging lubricant comprises, in a multi-shaft engine at the interface between two counter rotating shafts wherein the windage from the two counter rotating shafts drives the lubricant in a first rotational direction on one side of the interface and in a second rotational direction on another side of the interface, and a fixed sump housing surrounds the interface, axially locating a draining orifice in the sump housing proximate the interface where the net windage approaches a minimum. In some embodiments the method further comprises collecting the lubricant with a recess in the sump housing proximate the draining orifice. In some embodiments the method further comprises slowing the lubricant relative to the fixed sump housing with blunt walls formed in the recess. In some embodiments the method further comprises turning the lubricant on both sides of the interface from a circumferential direction to an axial direction towards the draining orifice. In some embodiments the method further comprises reducing the drive on the lubricant by extending a windage wall radially inward from the sump housing on both sides of the interface. In some embodiments the method further comprises creating a radial lubricant passage through a pedestal mount coupled to the sump housing. In some embodiments the method further comprises creating an axial lubricant passage through the pedestal mount by spacing apart a plurality of stand-off pedestals.

According to an aspect of the present disclosure, an oil sump housing comprises an inner surface; an outer surface; two annular mount rings extending radially inward from the inner surface; a draining orifice located axially between the two annular mount rings and extending though the inner surface to the outer surface; two channels recessed into the housing, each channel originating outboard of the two annular mount rings and terminating at the draining orifice.

In some embodiments the oil sump housing further comprises a rectangular recess around the drain hole, wherein the rectangular recess forms a portion of the two channels. In some embodiments each of the two annular mount rings are adapted to receive a respective shaft, each respective shaft having a rotation opposite the other. In some embodiments the two annular mount rings extend radially parallel to each other.

BRIEF DESCRIPTION OF THE DRAWINGS

The following will be apparent from elements of the figures, which are provided for illustrative purposes and are not necessarily to scale.

Figure 1:
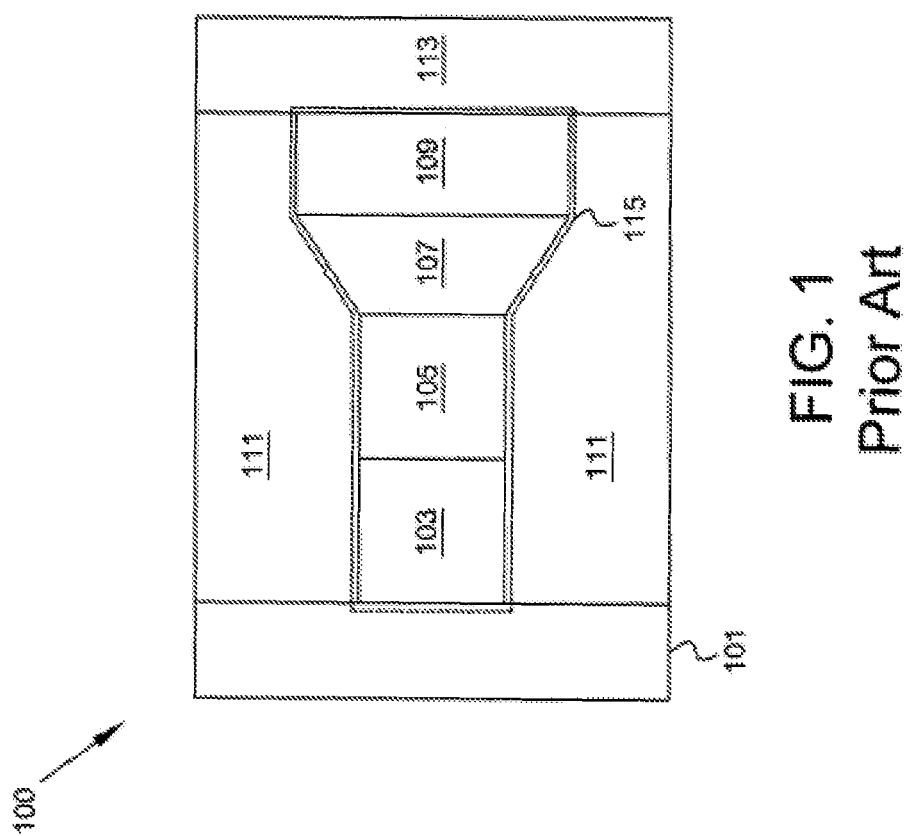
FIG. 1 is a block schematic diagram of a typical turbofan engine.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

This disclosure presents embodiments to overcome the aforementioned deficiencies of lubrication scavenge systems in turbine engines, notably in turbine engines having counter-rotating shafts. More specifically, this disclosure is directed to a lubrication scavenge system which allows for a single collection point in a lubricant sump housing and therefore eliminates the need for more than one sump, collection point, lubricant lines, pumps, and attendant structures. The lubricant scavenge system described herein comprises a lubricant sump housing having a single collection point and disposed relative to a windage quiet zone created during operation of counter-rotating shafts.

Although the disclosure below is directed to a lubrication scavenge system for a turbine engine, one of skill in the art will appreciate that the disclosure is applicable to similar structures which rotate at relatively high speeds such as turbochargers, superchargers, and reciprocating engines.

Figure 2:
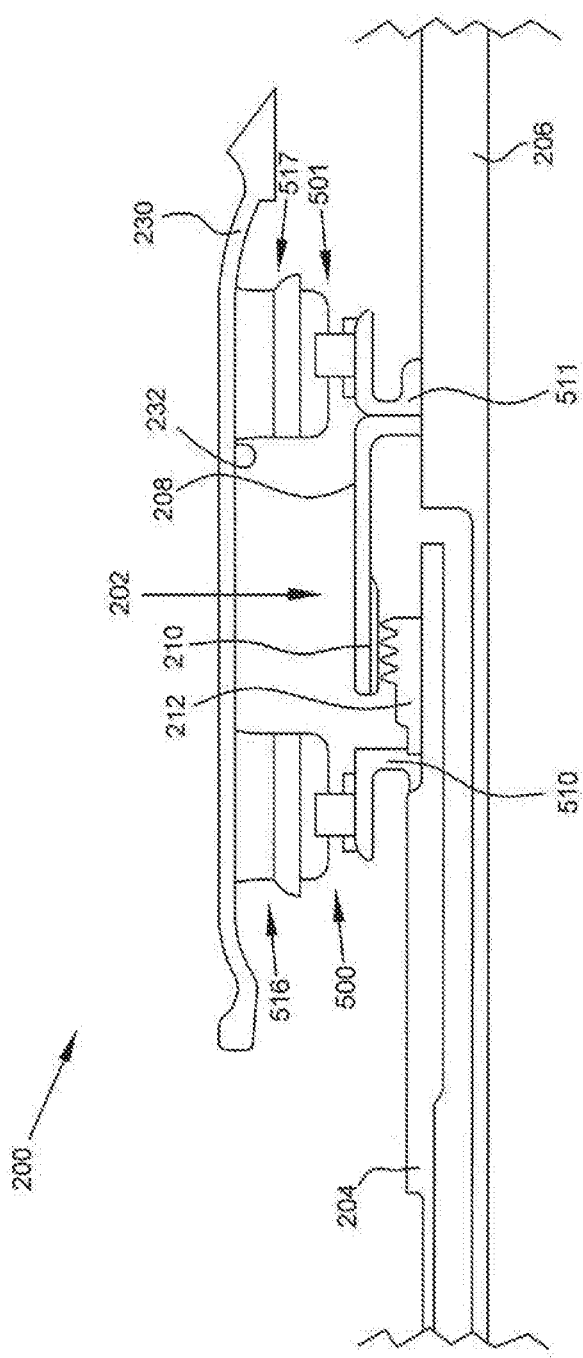
FIG. 2 is a side cutaway view of an inter-shaft region of a turbine engine in accordance with some embodiments of the present disclosure.

FIG. 2 is a side cutaway view of an inter-shaft region 200 of a turbine engine. An inter-shaft seal assembly 202 is formed between a high-pressure shaft 204 and low-pressure shaft 206. High-pressure shaft 204 and low-pressure shaft 206 are concentric, with high-pressure shaft 204 circumferentially disposed radially outward from low-pressure shaft 206. High-pressure shaft 204 and low-pressure shaft 206 may also be counter-rotating. In some embodiments, high-pressure shaft 204 rotates in a counter-clockwise direction when viewed axially forward-to-aft, and low-pressure shaft 206 rotates in a clockwise direction when viewed axially forward-to-aft. During operation, both high-pressure shaft 204 and low-pressure shaft 206 are rotating at high rotational velocities. Inter-shaft region 200 is also referred to as the interface region as it serves as the interface between high pressure shaft 204 and low pressure shaft 206.

The use of forward and aft in the description of the embodiments are with reference to the Figures: upstream or forward being towards the left and downstream or aft being towards the right. As shown in the embodiments, the interface is between the high pressure turbine 107 and the low pressure turbine 109; the disclosed subject matter is equally applicable to the interface between a low pressure compressor or fan and a high pressure compressor, in which the fore and aft positioning would be reversed.

Inter-shaft seal assembly 202 comprises an axially-extending arm 208 having a sealing surface 210, and sealing member 212. Arm 208 extends axially forward from low-pressure shaft 206. Sealing member 212 extends radially from high-pressure shaft 204 such that the sealing member 212 abuts sealing surface 210 to form the inter-shaft seal.

A pair of bearing assemblies 500, 501 are disposed about the inter-shaft seal assembly 202. A forward bearing assembly 500 is disposed axially forward of the inter-shaft seal assembly 202 and an aft bearing assembly 501 is disposed axially aft of the inter-shaft seal assembly 202. As will be described in greater detail with reference to FIG. 5 below, each bearing assembly 500, 501 comprises an inner race, outer race, and bearing element.

Each bearing assembly 500, 501 is radially disposed between a lubricant scoop 510, 511 and a pedestal mount 516, 517. Forward pedestal mount 516 and aft pedestal mount 517 are coupled to lubricant sump housing 230. Lubricant sump housing 230 may be mounted to the engine frame or similar mounting structure via mounting brackets, sealing elements, and mounting implements (not shown) such as fasteners. Lubricant sump housing 230 may thus be fixed and may not rotate.

In general, the centrifugal forces and windage created by the rotation of high-pressure shaft 204 and low-pressure shaft 206 act to move lubricant in a radially-outward direction. Lubricant captured between forward lubricant scoop 510 and high-pressure shaft 204, or lubricant captured between aft lubricant scoop 511 and low-pressure shaft 206, will move radially outward to the bearing assemblies 500, 501, the pedestal mounts 516, 517, and eventually to be disposed along the radially inner surface 232 of the lubricant sump housing 230. A more detailed description of the lubricant flow path is provided below. The lubricant sump housing 230 serves to guide lubricant into a collecting point.

Figure 5:
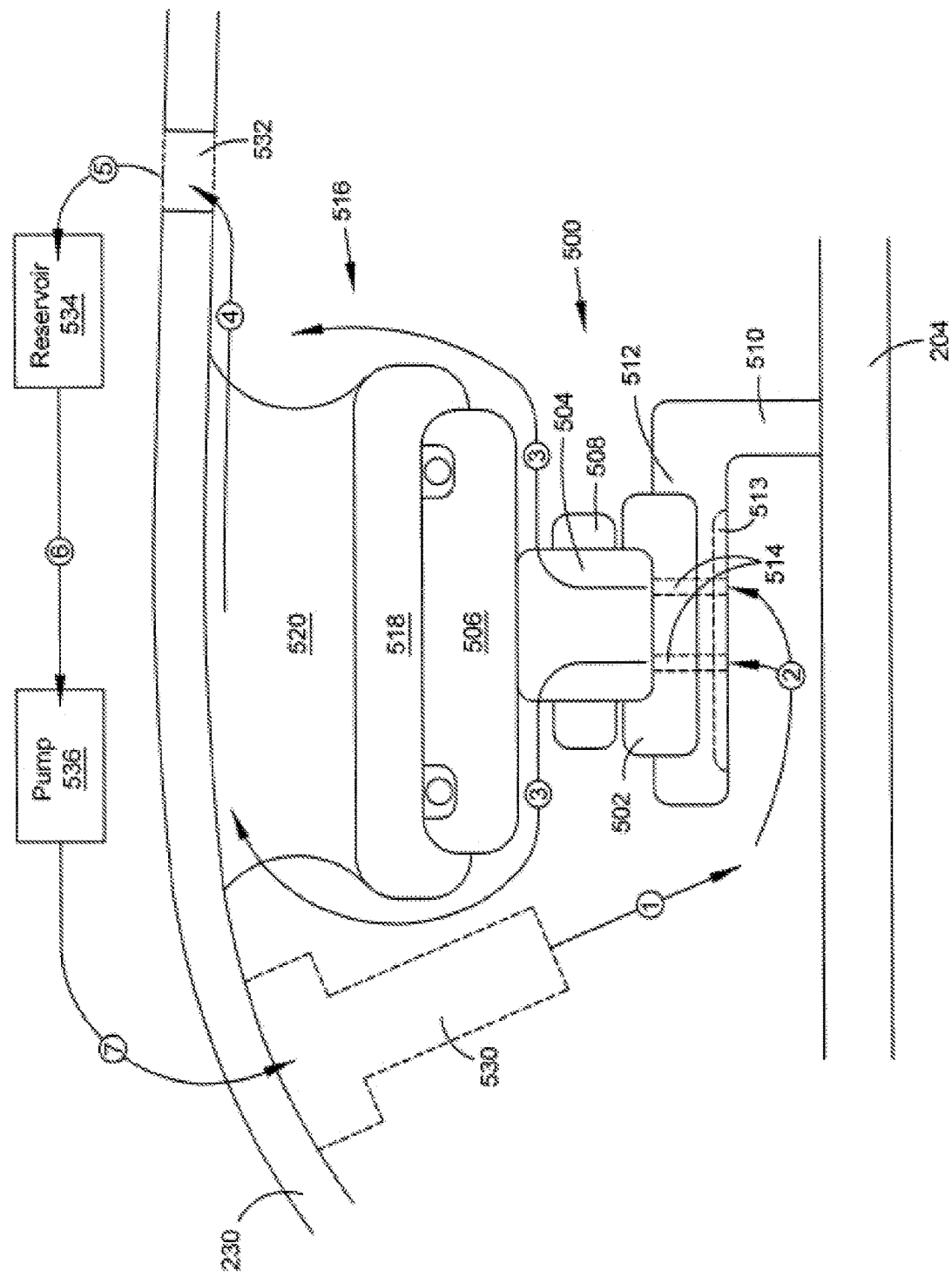
FIG. 5 is a detailed side cutaway view of a bearing region of a turbine engine with lubricant flow indicators in accordance with some embodiments of the present disclosure.

With attention now to FIG. 5, the flow cycle for bearing lubricant is illustrated and described. FIG. 5 is a detailed side cutaway view of a bearing region of a turbine engine with lubricant flow indicators.

As discussed above with reference to FIG. 2, a bearing assembly 500 comprises an inner race 502, bearing element 504, and outer race 506. In some embodiments a separator 508 is included axially forward and aft of the bearing element 504. Bearing element 504 is radially retained between the inner race 502 and outer race 506. In some embodiments bearing element 504 is a rolling element.

Inner race 502 is radially disposed between bearing element 504 and a lubricant scoop 510 which has an axially-extending scoop arm 512. Lubricant scoop 510 extends from a shaft, which is illustrated as high speed shaft 204. Scoop arm 512 has a receiver surface 513 which guides lubricant to at least one radially inner fluid pathway 514 extending through inner race 502 and to bearing element 504. The flow of lubricant through the inner race 502 and onto bearing element 504 maintains bearing element 504 lubricated.

Outer race 506 is radially disposed between bearing element 504 and pedestal mount 516. The pedestal mount 516 comprises an annular mount ring 518, also referred to as a bearing ring, configured to receive outer race 504 and a plurality of stand-off pedestals 520 spaced about the circumference of the annular mount ring 518 and attached to the radially outer surface 520 thereof. Stand-off pedestals 520 couple the annular mount ring 518 to lubricant sump housing 230.

Figure 6:
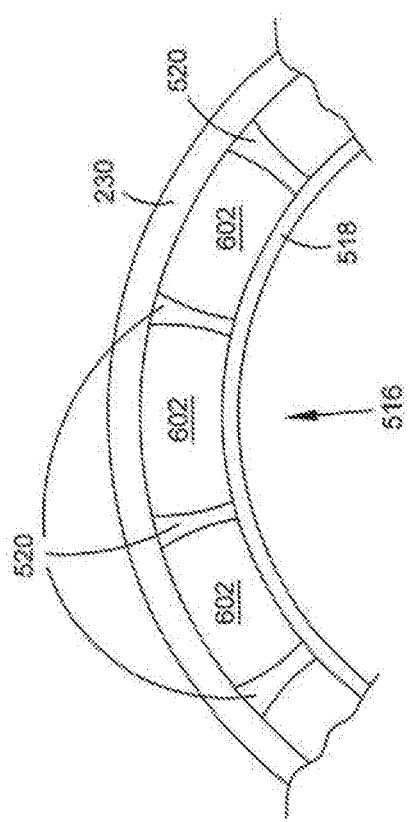
FIG. 6 is an axial cutaway view of a pedestal mount and lubricant sump housing in accordance with some embodiments of the present disclosure.

As illustrated in FIG. 6, stand-off pedestals 520 are spaced apart around the circumference of the annular mount ring 518 to create axial fluid pathways 602 between the stand-off pedestals 520. This allows lubricant to move axially forward and aft between the stand-off pedestals 520 and within the sump area and reduces the effect of windage upon the lubricant.

In some embodiments, stand-off pedestals 520 are normal to the axis. In other embodiments stand-off pedestals 520 are disposed at an angle relative to the axis or otherwise configured to assist in directing lubricant toward the collection point 532.

The numbered arrows of FIG. 5 illustrate a typical lubricant flow cycle as it relates to the disclosed bearing assembly 500. Arrow 1 indicates that pressurized lubricant is ejected from a nozzle 530 in the direction of high speed shaft 204 and lubricant scoop 510. As indicated by Arrow 2, the lubricant is captured by the scoop 510 and directed, via receiver surface 513, into a radially inner fluid pathway 514 and from there onto the bearing element 504. Arrow 3 shows lubricant traveling radially outward after passing over the bearing element 504. Specifically, the lubricant exits bearing element 504 axially forward and axially aft of outer race 506 and annular ring mount 518. Lubricant continues radially outward around outer race 506 and annular ring mount 518 until it contacts the radially inner surface 232 of lubricant sump housing 230. Arrow 4 illustrates lubricant flowing axially along the radially inner surface 232 of lubricant sump housing 230 and entering an orifice 532 which serves as a collection point for the lubricant. Transiting through the orifice 532 leads the lubricant to a reservoir 534 as indicated with Arrow 5. The lubricant is drawn from the reservoir 534 by a pump 536 (Arrow 6), which pressurizes the lubricant and returns it to nozzle 530 for ejection (Arrow 7). In some embodiments a scavenge line (not shown) leads directly from the orifice 532 to pump 536 and no reservoir 534 is included in the system.

Figure 3:
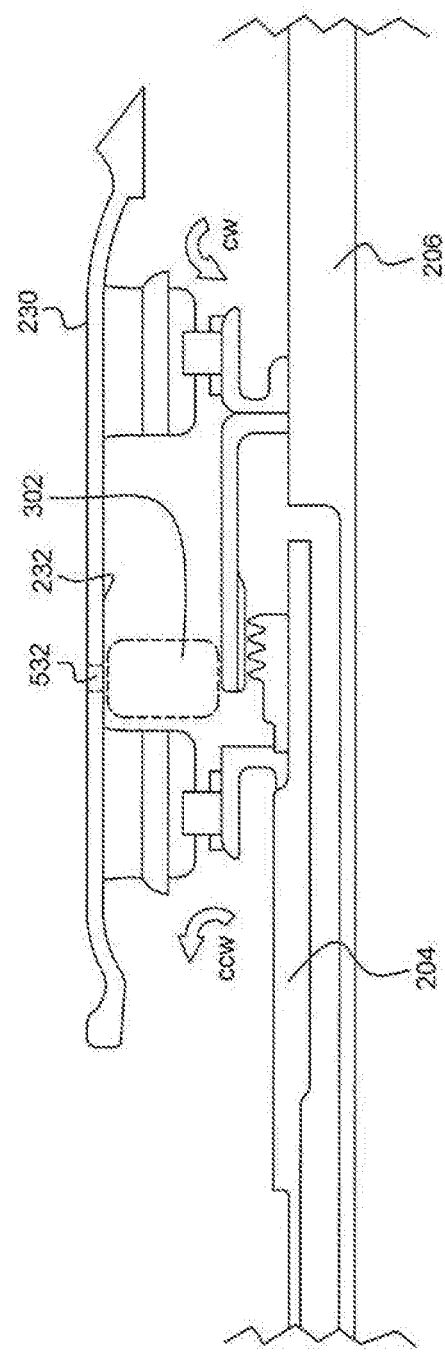
FIG. 3 is a side cutaway view of an inter-shaft region of a turbine engine with air motion indicators in accordance with some embodiments of the present disclosure.

FIG. 3 is a side cutaway view of an inter-shaft region 200 of a turbine engine with air motion indicators. Rotation of the shafts 204, 206 will cause the air inside the lubricant sump housing 230 to rotate as well. In the vicinity of high-pressure shaft 204, in some embodiments air will rotate in a counter-clockwise direction when viewed axially forward-to-aft. This motion is indicated by the arrow labeled CCW and, in the context of FIG. 3, would appear to be moving into the page. In the vicinity of low-pressure shaft 206, in some embodiments air will rotate in a clockwise direction when viewed axially forward-to-aft. This motion is indicated by the arrow labeled CW and, in the context of FIG. 3, would appear to be moving out of the page.

Where the air moving in a counter-clockwise direction meets the air moving in a clockwise direction, vortices are formed which tend to reduce air speed and create a quiet zone 302. The reduced air speeds of the quiet zone 302 result in reduced windage influence upon the lubricant disposed along the radially-inner surface 232 of lubricant sump housing 230. For this reason, the quiet zone 302 is an ideal location for a collection point in the lubricant sump housing 230. In some embodiments the orifice 532 for collecting lubricant is axially located where the net windage approaches a minimum.

Figure 4A:
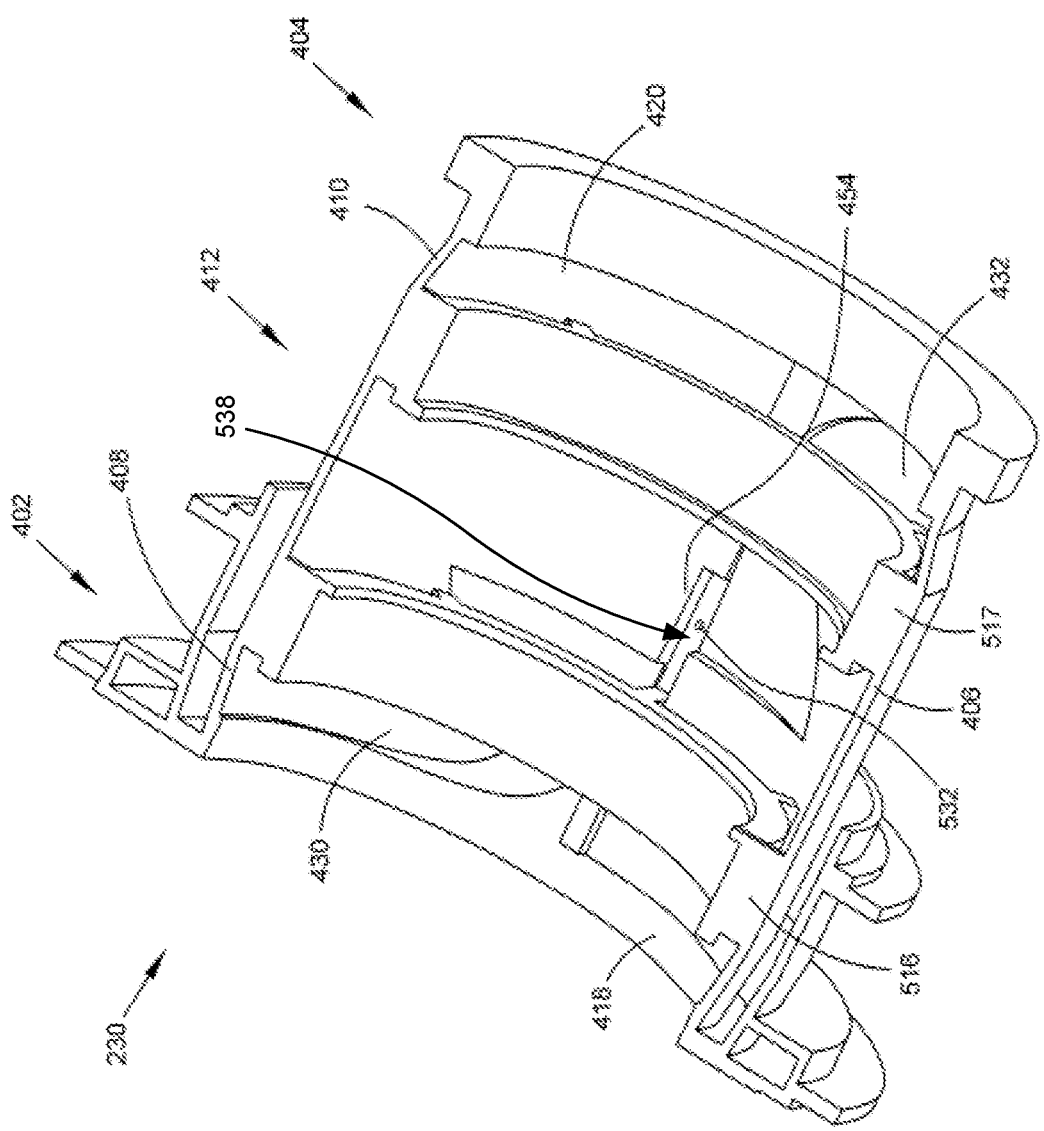
FIG. 4A is an isometric view of a cross sectioned lubricant sump housing in accordance with some embodiments of the present disclosure.
Figure 4B:
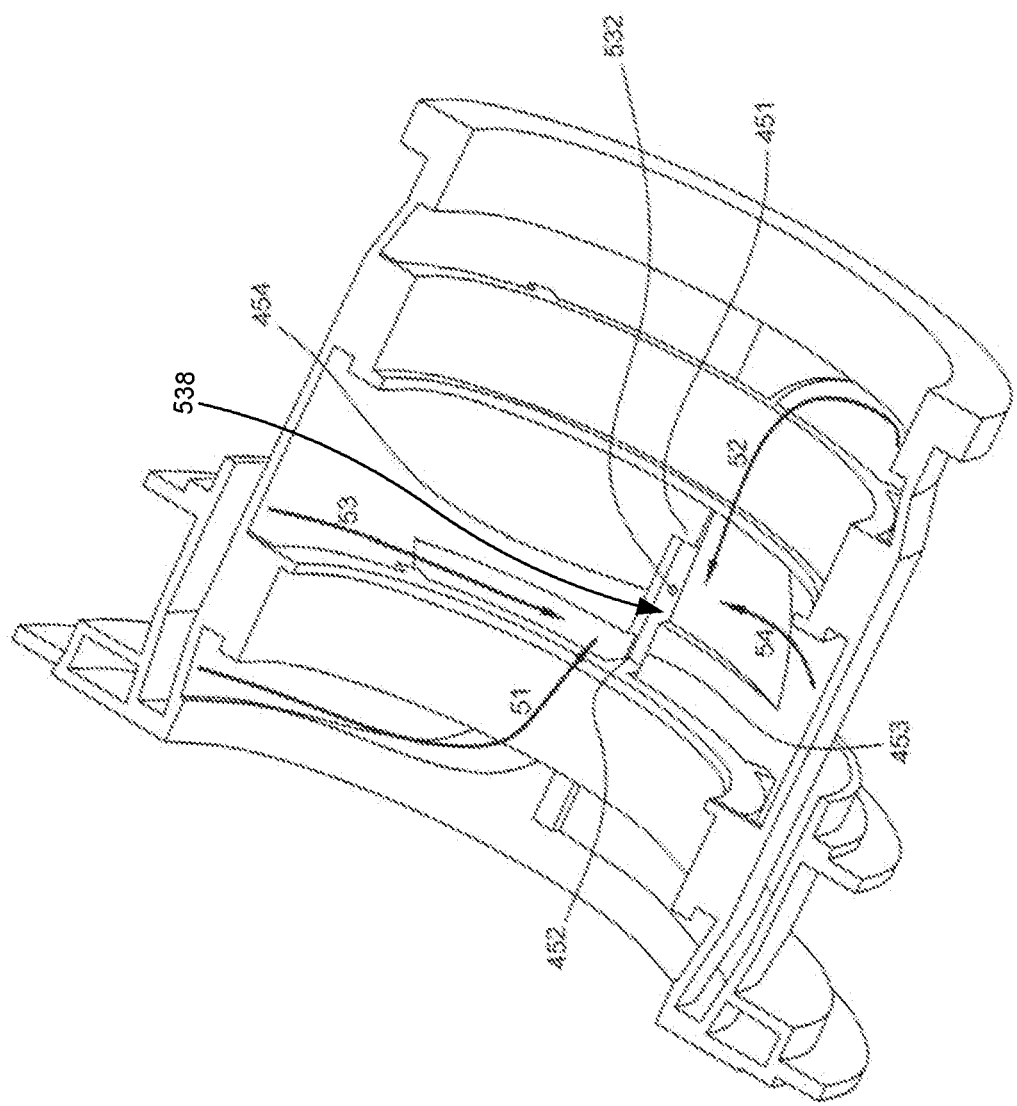
FIG. 4B is an isometric view of a cross sectioned lubricant sump housing with lubricant flow indicators in accordance with some embodiments of the present disclosure.

FIGS. 4A and 4B are isometric views of a cross sectioned lubricant sump housing 230. These figures illustrate several of the features of the lubricant sump housing 230 which assist in the collection of lubricant at orifice 532 (also called a collection point).

First, consistent with the illustration in FIG. 2, the axially forward portion 402 and axially aft portion 404 of the outer wall 406 of lubricant sump housing 230 have sloped radially inner surfaces 408, 410. As these surfaces 408, 410 extend axially toward central portion 412, the radial distance between the surface 408, 410 and the axis of rotation increases. In some embodiments, surfaces 408, 410 have a conical shape. These sloped surfaces 408, 410 guide lubricant toward central portion 412 which comprises a cylindrical section of the lubricant sump housing 230 having a larger diameter than at axially forward portion 402 or axially aft portion 404. Rotational forces acting on lubricant in either the axially forward portion 402 or axially aft portion 404 will push the lubricant radially outward, causing the lubricant to move toward central portion 412.

Although discussed above with reference to FIGS. 5 and 6, the forward pedestal mount 516 and aft pedestal mount 517 are illustrated in FIG. 4 as well. Lubricant sump housing 230 provides support for both pedestal mounts 516, 517 via the plurality of stand-off pedestals 520. As described with reference to FIG. 6, the stand-off pedestals 520 are spaced apart around the circumference of the annular mount ring 518 to create axial fluid pathways 602 between the stand-off pedestals 520. This allows lubricant and air to move axially forward and aft between the stand-off pedestals 520 and within the sump area.

Additional key features of the lubricant sump housing 230 include windage walls 418, 420 and turning passages 430, 432. A forward windage wall 418 is disposed axially forward of the forward pedestal mount 516. An aft windage wall 420 is disposed axially aft of the aft pedestal mount 517. A windage wall 418, 420 is a radially-extending surface which serves to block lubricant in the axially forward portion 402 from moving axially forward and block lubricant in the axially aft portion 404 from moving axially aft.

Forward windage wall 418 directs lubricant into forward turning passage 430. Forward turning passage 430 is a channel formed in the outer wall 406 which has an increasing radial distance from the axis of rotation as lubricant travels closer to orifice 532. Again, due to rotational forces lubricant disposed along the radially inner surface 232 will tend to travel in a direction that allows it to move radially outward. Forward turning passage 430 therefore directs lubricant to orifice 532 based on its increasing radial distance from the axis. Forward turning passage 430 is configured to capture and turn lubricant which is moving in a counter-clockwise direction, as discussed above with reference to FIG. 3. In some embodiments the sump housing 230 has only a single orifice 532 adapted for collection of lubricant.

Aft windage wall 420 directs lubricant into aft turning passage 432, which is shaped similarly to forward turning passage 430 but is configured to capture and turn lubricant which is moving in a clockwise direction, as discussed above with reference to FIG. 3.

Forward and aft turning passages 430, 432 therefore redirect lubricant disposed along the radially inner surface 232 of the lubricant sump housing 230. Due to rotational forces, lubricant moves in a circumferential direction about the radially inner surface 232; however, turning passages 430, 432 redirect lubricant to move in an axial direction toward central portion 412 and orifice 532.

In addition to windage walls 418, 420, at least one blunt wall 454 is formed in the radially inner surface 232 in the vicinity of orifice 532. A blunt wall 454 is a radially-extending surface which runs axially in the central portion 412 and is configured to stop lubricant which is moving circumferentially about the central portion 412 and direct it into orifice 532.

In some embodiments four blunt walls are used. This is because in the central portion 412 there are four different streams of lubricant moving toward orifice 532. These streams are illustrated in FIG. 4B. A first stream S1 is moving axially from forward to aft. A second stream S2 is moving axially from aft to forward. A third stream S3 is moving circumferentially counter-clockwise, while a fourth stream S4 is moving circumferentially clockwise.

Blunt walls 451, 452, 453, and 454 are used to stop these streams S1, S2, S3, and S4 in order to slow the lubricant in the vicinity of orifice 532 and aide in the convergence of the streams S1, S2, S3, and S4 to allow the lubricant to pass through orifice 532. A first blunt wall 451 is disposed to slow or stop first stream S1. A second blunt wall 452 is disposed to slow or stop second stream S2. A third blunt wall 453 is disposed to slow or stop third stream S3. A fourth blunt wall 454 is disposed to slow or stop fourth stream S4. In some embodiments blunt walls 451, 452, 453, and 454 are disposed perpendicular to the stream S1, S2, S3, and S4, respectively.

Orifice 532 is disposed at the point of maximum radial distance from the axis of the radially-inner surface 232. In some embodiments, a recess 538 is formed proximate the orifice 532 to assist in directing lubricant into the orifice 532. In some embodiments orifice 532 is located in the bottom or lowest point of the sump housing 230 such that gravitational forces assist the lubricant in entering the orifice 532. In some embodiments, recess 538 is rectangular. The orifice 532 may be sized to meet the gravity flow and velocity requirements of the lubricant system. The orifice 532 may be connected to a scavenge line (not shown) and pump 536 which may be sized to minimize pooling of lubricant in the lubricant sump housing 230 area. In some embodiments the scavenge line leads to a lubricant reservoir 534 from which the pump 536 draws lubricant for distribution.

The lubricant sump housing 230 illustrated in FIGS. 4A and 4B is configured for the shaft rotational scheme described above with relation to FIG. 3 (i.e. high pressure shaft 204 rotates in a counter-clockwise direction while low-pressure shaft 206 rotates in a clockwise direction). In embodiments having the opposite shaft rotational scheme (i.e. high pressure shaft 204 rotates in a clockwise direction while low-pressure shaft 206 rotates in a counter-clockwise direction), the various features of the lubricant sump housing 230 would need to be configured accordingly, most likely by using a mirror image of the housing 230 illustrated in FIGS. 4A and 4B.

The disclosed lubricant scavenging systems provide numerous advantages over the prior art. Foremost among these advantages is the reduction in the complexity and number of parts needed to collect and distribute lubricant. Whereas previously a minimum of two collection points were necessary in the lubricant sump housing, now a single collection point is achievable due to the discovery and exploitation of the quiet zone. A single collection point requires fewer egress passages for the lubricant, resulting in reduced system complexity, potentially reduced maintenance costs, and potentially reduced weight penalties associated with the lubrication system.

Although examples are illustrated and described herein, embodiments are nevertheless not limited to the details shown, since various modifications and structural changes may be made therein by those of ordinary skill within the scope and range of equivalents of the claims.

What is claimed is:

1. An oil sump housing comprising:
   a radially inner surface;
   a radially outer surface;
   two annular mount rings extending radially inward from the inner surface;
   a draining orifice located axially between the two annular mount rings and extending through the inner surface to the outer surface;
   a first axial channel formed through a first annular mount ring of the two annular mount rings and a second axial channel formed through a second annular mount ring of the two annular mount rings, wherein both the first axial channel and the second axial channel lead to the draining orifice; and
   a pair of turning passages formed in the oil sump housing that extend circumferentially around a sump and turn axially towards the draining orifice, wherein the pair of turning passages are formed in part by at least a portion of the first axial channel and the second axial channel, respectively, and wherein the radial distance of each of the pair of turning passages from a center axis of the annular mount rings increases as a function of axial proximity to the draining orifice.

2. The oil sump housing of claim 1, further comprising a rectangular recess around the draining orifice, wherein the rectangular recess forms a portion of the two channels.

3. The oil sump housing of claim 2, wherein each of the two annular mount rings are adapted to receive a respective shaft.

4. The oil sump housing of claim 1, wherein the two annular mount rings extend radially parallel to each other.

5. A method of scavenging lubricant from an oil sump housing including a radially inner surface, a radially outer surface, two annular mount rings extending radially inward from the radially inner surface, a first axial channel formed through a first annular mount ring of the two annular mount rings and a second axial channel formed through a second annular mount ring of the two annular mount rings, and a pair of turning passages formed in the oil sump housing that extend circumferentially around a sump, the method comprising:
   axially locating a draining orifice in an oil sump housing between the two annular mount rings and extending through the inner surface to the outer surface, wherein both the first axial channel and the second axial channel lead to the draining orifice, wherein the pair of turning passages turn axially towards the draining orifice, wherein the pair of turning passages are formed in part by at least a portion of the first axial channel and the second axial channel, respectively, and wherein the radial distance of each of the pair of turning passages from a center axis of the annular mount rings increases as a function of axial proximity to the draining orifice.

6. The method of claim 5, further comprising collecting the lubricant with a recess in the sump housing proximate the draining orifice.

7. The method of claim 6, further comprising slowing the lubricant relative to the fixed sump housing with blunt walls formed in the recess.

8. The method of claim 5, further comprising creating the first axial channel and the second axial channel through a pedestal mount supporting the annular mount rings by spacing apart a plurality of stand-off pedestals.

* * * * *